United States Patent [19]

Boyd et al.

[11] Patent Number: 5,189,116
[45] Date of Patent: Feb. 23, 1993

[54] EXTREMELY TOUGH THERMOSETTING BISMALEIMIDE RESIN SYSTEMS

[75] Inventors: Jack D. Boyd, Westminster; Linas N. Repecka, Lakewood, both of Calif.

[73] Assignee: BASF Aktiengesellschaft, Ludwigshafen, Fed. Rep. of Germany

[21] Appl. No.: 413,429

[22] Filed: Sep. 27, 1989

Related U.S. Application Data

[63] Continuation-in-part of Ser. No. 312,526, Feb. 17, 1989, Pat. No. 5,037,689.

[51] Int. Cl.$^5$ .................. C08L 79/08; C08L 81/06
[52] U.S. Cl. ..................... 525/423; 525/426; 525/436; 525/471; 525/535; 525/537; 428/113; 428/240; 428/283; 428/413; 428/473.5; 428/524
[58] Field of Search ............... 525/423, 426, 471, 535, 525/537

[56] References Cited

U.S. PATENT DOCUMENTS

| | | | |
|---|---|---|---|
| 4,127,615 | 11/1978 | Zahir et al. | 260/837 R |
| 4,557,860 | 12/1985 | DiSalvo et al. | 525/423 |
| 4,604,230 | 8/1986 | Goswami et al. | 525/423 |
| 4,652,398 | 3/1987 | Goswami et al. | 525/423 |
| 4,774,282 | 9/1988 | Qureshi | 525/467 |
| 4,826,927 | 5/1989 | Schmid et al. | 525/423 |
| 4,954,195 | 9/1990 | Turpin | 525/524 |
| 4,957,801 | 9/1990 | Maranci et al. | 428/147 |
| 5,003,018 | 3/1991 | Repecka | 526/262 |

FOREIGN PATENT DOCUMENTS 59-191726 10/1984 Japan.
62-30122 2/1987 Japan.

*Primary Examiner*—Ana L. Carrillo
*Attorney, Agent, or Firm*—William G. Conger

[57] ABSTRACT

Bismaleimide resin systems containing low viscosity epoxy resins and a swellable or soluble thermoplastic when utilized to impregnate intermediate modulus carbon fiber are capable of preparing quasiisotropic composites, which, when cured, exhibit compression strengths after impact of greater than 47–50 ksi after an impact of 1500 in-lb/in.

25 Claims, No Drawings

EXTREMELY TOUGH THERMOSETTING BISMALEIMIDE RESIN SYSTEMS

This is a continuation-in-part of copending application Ser. No. 312,526, filed Feb. 17, 1989, now U.S. Pat. No. 5,037,689 which is herein incorporated by reference.

BACKGROUND OF THE INVENTION

1. Field of the Invention

The subject invention pertains to thermosetting bismaleimide resin systems. More particularly, the subject invention pertains to bismaleimide resin systems containing both a particulate thermoplastic toughener and a minor quantity of a low viscosity epoxy resin. Such resin systems exhibit surprisingly high compression after impact (CAI) strengths when used as the matrix resin in carbon fiber reinforced composites.

2. Description of the Related Art

Although many thermoplastics are tough, ductile materials, their use in structural materials has been minimal for several reasons. First, many of the thermoplastics do not have the required solvent resistance, thermal stability, and high softening points required in demanding aerospace applications. Second, the high temperature engineering thermoplastics are difficult to process, often requiring both high temperature and pressure to produce acceptable fiber reinforced parts.

For these reasons, and despite the proliferation and improvement of high temperature, high performance thermoplastics, thermosetting systems currently remain the important commercial resin systems. Of the thermosets available, by far the most common are the epoxies, the bismaleimides, and the cyanates. Each of these resin systems has its own unique set of physical and chemical attributes, but all are glassy, generally crosslinked systems which tend to be brittle. Thus attempts at toughening such systems have become increasingly important.

By the term toughness is meant resistance to impact induced damage. Toughness in cured neat resin samples may be assessed by the critical stress intensity factor, $K_{1C}$, among others. Toughness in fiber reinforced composites prepared by laying up and subsequently curing numerous plies of prepregs is best assessed by measuring the compression strength after an impact of suitable energy. Generally, an impact of 1000 or 1500 in-lb/in (respectively, 4.45 and 6.68 kJ/m) is used, and compression after impact (CAI) values measured in accordance with Boeing test BSS 7260 on a quasiisotropic $[+45/0/-45/90]_{4s}$ layup. Similar tests may be specified by other aerospace manufacturers.

Elastomers have been used with good success in toughening a number of thermosetting resins, particularly epoxy resins. Examples of such systems are given in Bauer, *Epoxy Resin Chemistry II*, Chapters 1-5, ACS Symposium Series 221, American Chemical Society, Washington, D.C., 1983. Both soluble and infusible elastomers have been utilized, the former generally increasing flexibility at the expense of physical properties such as tensile modulus, while the latter generally increase toughness without substantially affecting bulk properties. Both types of modification generally lead to lower thermal properties, an effect which can be minimized when polysiloxane elastomers are utilized.

Soluble thermoplastics have also been used, for example in the article by Bucknall and Partridge, "Phase Separation in Epoxy Resins Containing Polyethersulfone," *Polymer* 24 639-646 (1983). In Bucknall's examples, dissolution of up to 17 percent by weight of a polyethersulfone having a molecular weight slightly greater than 20,000 Daltons in an epoxy formulation increased toughness as measured by $K_{1C}$ by up to 50 percent. At the highest levels, phase separation was noted upon cure of the system, the resulting cured neat resin consisting of the glassy polyethersulfone discontinuous phase dispersed within a glassy epoxy continuous phase. With epoxy resins having an average functionality of four, no phase separation was observed, although the cured system still displayed enhanced toughness.

Dissolution of up to 80 weight percent of soluble polyimide PI2080 into the bismaleimide of bis[4-aminophenyl]methane was disclosed by Yamamoto in "Preparation and Characterization of Thermo-Plastic/Thermo-Setting Polyimide Blends," published in SAMPE Journal, July/August, 1985. However, resin systems containing high levels of dissolved polyimide are difficult to process and generally have little if any tack, an important consideration in the laying up of prepregs into composites. Furthermore, high levels of dissolved thermoplastic make fiber impregnation by the film method difficult.

Toughened systems have also been proposed which rely for toughness, on the use of oligomeric curing agents or monomers. Such monomers and curing agents have less crosslink density and thus are inherently more flexible, tougher systems. In U.S. Pat. No. 4,608,404, for example, epoxy resin systems containing an epoxy resin and an oligomeric amine terminated polyethersulfone is disclosed. Such systems were capable of providing composites having CAI (compression after impact, see infra) values of greater than 30 Ksi, particularly when diaminodiphenylsulfone (DDS) was used as a co-curative.

In U.S. Pat. Nos. 4,656,207 and 4,656,208, the principles of Bucknall and Partridge and of the '404 patentees were logically combined to provide epoxy systems employing DDS and greater than 25 percent by weight of a reactive polyethersulfone oligomer having a molecular weight of from 2000 to 10,000 Daltons. These epoxy systems cure into two phase systems having a glassy discontinuous phase dispersed within a glassy continuous phase as disclosed by Bucknall but utilizing a lower molecular weight, and thus more soluble and less viscous, polyethersulfone oligomer. Carbon fiber reinforced composites employing the resin systems of the '207 and '208 patents are able to achieve CAI values in excess of 40 Ksi. Other researchers have utilized analogous technologies with bismaleimide resins.

In U.S. Pat. No. 4,604,319, discrete films of thermoplastic, optionally containing up to 40 percent by weight thermosetting resin, are applied under heat and pressure to epoxy or bismaleimide prepregs containing carbon fibers as reinforcement. When such film faced prepregs are laminated together to form a composite, CAI values greater than 40 Ksi can be obtained. Unfortunately, such prepregs have not been accepted by the industry due to the possibility of a mistake during layup wherein two thermoplastic films might abut each other, promoting catastrophic interlaminar separation. Furthermore, such prepregs have little tack, and thus make composite layup difficult.

In European patent EP-A-0 252 725, elastomeric interlayers are formed in situ by the filtering out of discrete, infusible particles by the fiber reinforcement because the particles are larger (10–75 μm) than the fiber interstices. Prepregs such as these and composites formed therefrom have the capability of having CAI values in the 40–50 Ksi range, but may suffer from lower properties at elevated temperatures.

In European patent EP-A-0 274 899, the addition of thermoplastics, preferably in the form of solid, spherical particles, to thermosettable resin systems is said to cause an increase in toughness in carbon fiber laminates. Examples of thermoplastics are polyamideimides, polybutyleneterephthalate, and nylon, with transparent nylons being preferred. When particles greater than 2μm in diameter are utilized, the thermoplastic is concentrated in situ onto the outside of the prepreg as in EP-A-0 252 725. When particles having a size less than 2 μm are used, the thermoplastic remains homogenously dispersed within the prepreg.

U.S. Pat. No. 4,131,632 indicates that bismaleimides and epoxy resins may be combined, but that the content of bismaleimide must be limited to no more than 30 weight percent due to the incompatibility of the bismaleimide and epoxy resins. U.S. Pat. No. 4,212,959 also discloses these drawbacks of combination epoxy and bismaleimide resin systems, as well as the further drawback that such systems exhibit high shrinkage during cure. Such resin systems would be expected to result in distorted composites and/or severe microcracking when utilized as thermosetting matrix resins in structural composites.

In U.S. Pat. No. 4,743,647, epoxy resins are one of many suggested comonomers which may be added to bismaleimide resins, particularly with the use of diamine epoxy resin curing agents. However, no guidance as to the selection of epoxy resins or curing agents and no examples of such use are given. In U.S. Pat. No. 4,510,272, the use of bismaleimides in epoxy resin systems is taught, but once again, no direction as to selection of epoxy resin is given. The epoxies are cited as improving the high temperature water resistance. No mention of toughness as reflected by resistance to impact is mentioned. Furthermore, the systems exemplified all contain about 30 weight percent or more of the epoxy resin, generally in conjunction with an amine curing agent.

SUMMARY OF THE INVENTION

In copending parent application Ser. No. 312,526, now U.S. Pat. No. 5,037,689 the use of epoxy resins as but one of a variety of potential comonomers in bismaleimide resin systems was suggested. It has now been found that bismaleimide resin systems with exceptional levels of toughness may be prepared by including in the resin system a particulate thermoplastic polyimide and a low viscosity epoxy resin. The use of these epoxies would be expected to lower overall cured system performance, for example use temperature, while providing certain benefits to the uncured system such as greater tack and drape. However, many low viscosity epoxy resins have surprisingly been found to synergistically increase the toughness of resin systems employing both bismaleimide monomers and particulate thermoplastics. Further, it is believed that the use of such epoxy comonomers increases the variety of useful particulate engineering thermoplastics useful in such systems. Quasiisotropic panels of carbon fiber reinforced prepregs prepared utilizing the subject invention resin systems are capable of exhibiting compression strengths greater than 50 Ksi while maintaining the high temperature use characteristics of bismaleimide resin systems, and avoiding distortion and microcracking.

DESCRIPTION OF THE PREFERRED EMBODIMENTS

The present invention concerns the addition of a select group of thermoplastic polyimides in solid form in conjunction with an epoxy resin having a viscosity of less than about 25,000 cps, to bismaleimide resin systems in order to provide increased toughness, and, in particular, significant resistance to impact induced damage. The thermoplastic polyimides are added to the uncured bismaleimide resin preferably by means of a slurry mixing process by means of which a substantial amount of polyimide remains in a particulate form having a mean size between 2 and 80 μm in the neat uncured matrix resin. During the prepregging operation, a substantial amount of these polyimide particles are filtered out by the reinforcing fibers, forming a thermoplastic rich and/or thermoplastic particle-rich zone substantially exterior to the fibers. Following cure, the polyimide may remain as a largely continuous film in the interlayer zone or as a thermoplastic enriched, cured, bismaleimide layer.

The bismaleimide monomers useful in the subject invention are well known to those skilled in the art and in most cases are commercial products of ready availability. The bismaleimides are generally prepared by the reaction of an unsaturated anhydride with the primary amino groups of a di- or polyamine, and as used herein, the term bismaleimide includes minor amounts of maleimide-group-containing monomers of higher functionality, i.e. tris- and tetra-maleimides. However, the preferred bismaleimides are difunctional. The term bismaleimide as used herein also includes the closely related nadic imides and allylnadic imides which are prepared in substantially the same manner as the bismaleimides but using an unsaturated anhydride such as the norbornene dicarboxylic acid anhydrides formed from the Diels-Alder reaction of maleic anhydride or substituted maleic anhydrides with cyclopentadiene or substituted cyclopentadienes, particularly methylcyclopentadiene.

Suitable bismaleimides and methods for their preparation are disclosed, for example, in U.S. Pat. Nos. 4,604,437; 4,100,140; 4,130,564; 4,138,406; 4,154,737; 4,229,351; and 4,689,378 which are herein incorporated by reference in their entirety. Particularly preferred bismaleimides include the bismaleimides of the toluene diamines and 4,4'-methylenedianiline, and the commercially available eutectic bismaleimide mixtures. These latter mixtures, one of which is COMPIMIDE ® 353, a product of Shell Chemical Co., formerly available from Boots-Technochemie, are mixtures of two or more bismaleimides, the mixture of which has a lower melting point than the bismaleimides alone. COMPIMIDE ® 353, for example, contains the bismaleimides of 4,4'-diaminodiphenylmethane, toluene diamine, and 1,6-diamino-2,2,4-trimethylhexane. Other eutectic bismaleimide mixtures may be prepared through suitable combinations of various aromatic bismaleimides and/or aliphatic bismaleimides. Suitable aliphatic bismaleimides which may be utilized to form eutectic bismaleimide components include the bismaleimides of 1,6-hexanediamine, isophoronediamine and the diaminocyclohexanes. Eutectic bismaleimides are particularly preferred in preparing resin systems with suitable tack, but do not necessarily result in composites with maximal physical properties.

The term "bismaleimide monomer" as used herein encompasses both low molecular weight as well as higher molecular weight bismaleimides. The latter are generally prepared by the reaction of maleic anhydride with a suitable amine terminated oligomer such as the polyoxylene oxides, polyarylene sulfides, polyarylene sulfones, polyarylene ether sulfones, polyarylene ether ketones, and the like. Other higher molecular weight bismaleimides include maleimide terminated prepolymers prepared by reacting an excess of a bismaleimide with a diamine. Such products are available commercially. Generally, the higher molecular weight bismaleimide monomers have molecular weights of less then about 12,000, preferably less than 5000 Daltons.

The bismaleimide monomers described above are seldom used alone, but are most often used as a total resin system which may contain other polymerizable species in addition to fillers, rheology control agents, catalysts, fibrous and non-fibrous reinforcement, and the like. Particularly important in bismaleimide resin systems are various comonomers and reactive modifiers.

Among the comonomers useful with bismaleimides are the alkynyl and alkenylphenols and phenoxyethers. Alkenyl group-containing compounds, particularly alkenyl aromatic compounds may also be suitable comonomers. Examples of these compounds are styrene, 1,4-divinylbenzene, terephthalic acid diacrylate, cyanuric acid triacrylate, and glyceryl triacrylate. The corresponding allyl, methallyl, methacrylo, and methylvinyl group-containing compounds are also suitable.

Among the alkenylphenols and alkenylphenoxy ethers useful are particularly the allyl, methallyl, and propenyl phenols such as o,o'-diallylbisphenol A, eugenol, eugenol methylether, and similar compounds as disclosed in U.S. Pat. No. 4,100,140. Also useful are oligomers which are terminated with allyl- or propenyl-phenyl or allyl- or propenylphenoxy groups such the appropriately terminated polysiloxanes, polyetherketones, polyethersulfones, polyimides, polyetherimides, polymerized or chain extended epoxy derived resins, and the like. Suitably terminated oligomers, for example, may be prepared by allylating phenolated dicyclopentadienes and subsequently rearranging to the allylphenol as taught in U.S. Pat. No. 4,546,129, which is incorporated herein by reference. Most preferably, the alkenylphenol is o,o'-diallylbisphenol A or o,o'-dipropenylbisphenol A. The alkenylphenols and alkenylphenoxy comonomers are utilized in amounts of up to 70 weight percent based on the total system weight, preferably from 10 to 50 percent, and most preferably from about 20 to about 40 percent; or from 5 to about 150 percent, preferably from 30 to about 100 percent based on the weight of the bismaleimide(s). The corresponding alkynyl compounds are also useful.

Also useful as comonomers are the cyanate ester resins and their reaction products with bismaleimides. The cyanate ester resins contain the -OCN reactive moiety and are generally prepared by the reaction of a cyanogen halide with a di- or polyphenol. Suitable cyanate ester resins and methods for their preparation are disclosed in U.S. Pat. No. 4,546,131, which is herein incorporated by reference. Prepolymers prepared by the reaction of the cyanate resins with epoxy resins or with bismaleimide resins are also useful. The latter are available commercially from the Mitschubishi Gas Chemical Co. as "BT Triazine Resins."

Low viscosity epoxy resins are a necessary component of the subject invention. Among such resins are those described in the treatise *Handbook of Epoxy Resins*, Lee and Neville, McGraw-Hill, ©1967; and *Epoxy Resins Chemistry and Technology*, May and Tanaka, Marcel Dekker, ©1973. Particularly preferred are epoxy resins having viscosities of less than about 25,000 cps at 50° C., such as the epoxies derived from resorcinol, bisphenol A, and bisphenol F. Also exemplary are Cardolite ® NC-514 and Cardolite ® NC-551, epoxy resins from the Cardolite Corporation, Newark, N.J. which have viscosities of 25,000 cps and 600 cps, respectively. Generally, minor quantities of epoxy resins are utilized, for example up to about 30 percent by weight. Generally, however, lesser amounts, for example up to 25 percent, preferably less than 20 percent, and most preferably less than 10 percent by weight are useful. Lower levels are especially preferred in applications where a high $T_g$ is required.

Not every low viscosity epoxy resin is expected to increase the toughness of every bismaleimide resin system. Due to the complex interactions and interreactions, a minor amount of experimentation may be required to identify the optimal epoxy comonomer and the optimal amounts of the various system components. These experiments are routinely performed by those skilled in the art of formulating heat-curable resin systems of any type. In general, it has been found that the difunctional low viscosity epoxy resins perform the best with the systems tested thus far. Trisglycidyl p-aminophenol, for example, provides no increase in toughness with these systems although it does increase both tack and drape. However, it is quite likely that this same epoxy, when used in conjunction with the soluble or swellable thermoplastics of the subject invention, will increase the toughness of other bismaleimide resin systems.

Thus, in the remainder of the specification and in the claims, the term "low viscosity epoxy resin toughener" is meant to include only those epoxy resins which are capable of increasing the toughness of the base resin system (the same system minus the epoxy) by at least ten percent when tested according to BSS 7260 after an impact of 1500 in-lb/in. A suitable test to determine whether a given epoxy or mixture of epoxies is within the scope of the claims is to prepare and cure identical quasiisotropic panels with and without the epoxy(ies) and measure the compression strength after impact (CAI). If the CAI, after an impact of 1500 in-lb/in is about ten percent or more greater with the epoxy than for the same system without the epoxy, then the epoxy and the system containing it are within the scope contemplated by the claims.

Toughening modifiers are also useful in the practice of the subject invention. Generally, these are reactive oligomers having molecular weights of between 600 and 30,000 Daltons. These modifiers may be terminated with reactive groups or have medial reactive groups. Examples are the allyl or propenylphenols and phenoxy ethers discussed previously, or polymers or oligomers having amino, maleimide, cyanate, isocyanate, or other groups interreactive with bismaleimides. The backbone of these oligomers may be of diverse nature, for example polyarylenes such as the polyetherketones, polyetheretherketones, polysulfones, polyethersulfones and the like as prepared in U.S. Pat. No. 4,175,175 and in the article *Toughening of Bis Maleimide Resins: Synthesis and Characterization of Maleimide Terminated Poly (Arylene Ether) Oligomers and Polymers*, J. E. McGrath, et. al., NASA report n187-27036, Final Report Task 1-17000. The backbone may also be derived from polysiloxanes or, in particular, poly(dicyclopentadienes) terminated with allyl or propenyl phenol or phenoxy groups.

The particulate thermoplastics useful in the practice of the subject invention are limited to those which swell or dissolve during cure as discussed in parent application Ser. No. 312,526, now U.S. Pat. No. 5,037,689, and which are effective as toughening agents. Preferred thermoplastics are the so-called "engineering thermoplastics", having a $T_g$ greater than 150° C., preferably greater than 200° C. Especially prefered thermoplastics are the thermoplastic polyimides, particularly those having aliphatic groups attached to at least some of the aromatic nuclei in the polymer chain.

It is difficult if not impossible to predict which thermoplastic particles will be effective based on structure and/or physical properties alone. Generally, identification of a particular effective thermoplastic may be based as a first approximation on whether the particulate thermoplastic swells or dissolves in the resin system. If no swelling or dissolving takes place, then the thermoplastic is not suitable. If, after this screening test the thermoplastic is a suitable candidate for toughening, then a resin system containing the bismaleimide, the particulate thermoplastic, and any remaining system components other than the epoxy resin is prepared. The toughness of panels prepared from this matrix resin system is then compared to that of an otherwise similar system not containing the thermoplastic. If a statistically significant increase in toughness results, then the thermoplastic is suitable for the subject application. Preferably, the thermoplastic provides at least a ten percent increase in toughness as reflected in CAI values. It is conceivable that a particulate thermoplastic which is effective with one system of bismaleimides and associated non-epoxy comonomers might not be effective in another system.

The thermoplastic particles most extensively tested in preparing the resin systems of the subject invention are the polyimide thermoplastics derived from a bis(anhydride) and two particular diamines, toluenediamine (TDA) and 4,4'-diaminodiphenylmethane (MDA). These polyimides may also contain minor quantities, i.e. up to about 20 percent by weight of other diamines, so long as the amount does not affect the ability of the thermoplastic to toughen the bismaleimide. Preferably, the polyimide contains TDA and MDA in a weight ratio of 80/20.

The dianhydride selected to prepare the thermoplastic polyimide may be selected from numerous dianhydrides. These dianhydrides may be mononuclear or dinuclear, but are preferably dinuclear, i.e. the anhydride groups are located on different aromatic rings connected by a divalent linking group, or by a covalent bond. Examples of such dianhydrides are diphthalyl dianhydride, bis(phthalyl)methane dianhydride, bis(phthalyl)ketone dianhydride, bis(phthalyl)sulfide dianhydride, bis(phthalyl)sulfone dianhydride, their mixtures, and the like. Thus the preferred dianhydrides have the formula:

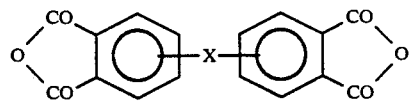

wherein X represents the organic linking group or a covalent bond. Preferably not more than about 20 weight percent of the total dianhydride component may comprise a mononuclear dianhydride such as 1,2,4,5-benzenetetracarboxylic acid dianhydride. Polyimides containing the residues of mononuclear dianhydrides are expected to be useful particularly when used in conjunction with at least a portion of aliphatic or alicyclic diamines. Preferably, the linking group is the carbonyl group. This dianhydride is more commonly called benzophenone tetracarboxylic acid dianhydride (BTDA).

In the foregoing description of the soluble polyimide thermoplastics useful in the subject invention, it has been assumed that the polyimide preparation will occur by polymerizing approximately equimolar quantities of a diamine and a dianhydride. However, there are also other means of preparing such polyimides. For example, suitable polyimides having substantially the same properties as those formed by the condensation polymerization of dianhydrides and diamines may be made by reacting a dianhydride with the diisocyanate corresponding to the diamine as taught by U.S. Pat. No. 4,001,186. In the specification and claims, the polyimide is identified as containing residues of BTDA and both TDA and MDA. This terminology also includes similar polyimides which formally contain such residues but which are produced in other ways, for example by the reaction of BTDA or benzophenone tetracarboxylic acid with mixtures of toluenediisocyanate and methylenediphenylenediisocyanate.

Most preferred as the thermoplastic is a polyimide available from Lenzing, A.G., A-4860 Lenzing, Austria as High Performance Powder P84, believed to be made in accordance with the teachings of U.S. Pat. No. 4,001,186, and may be considered as being derived from the residues of BTDA, TDA, and MDA, the latter two in a weight ratio of 80/20. The product may be further characterized by nominal physical properties as follows: a specific gravity of about 1.33; a heat deflection temperature [DIN 53461(A)] of 288° C.; a tensile strength (DIN 53455) of 110 MPa; and an elongation at break (DIN 53455) of 5 percent.

Other swellable or soluble polyimides and other types of swellable or soluble thermoplastics may also be useful, particularly when used in conjunction with the preferred polyimide. In such cases, less of the preferred polyimide may be used without sacrificing impact strength. Examples of other polyimides are the Ultem ® polyetherimides and Matrimid ® 5218 polyimides. However, Kapton ® polyimides are not expected to be useful as they neither swell nor dissolve in usual bismaleimide resin system components. Examples of other thermoplastics include the polyether sulfones, polyetherketones, and the like. Mixtures of thermoplastics may be physical mixtures of discrete polymer particles, or may be particles derived by size reduction of a homogenous polymer melt or film.

Whatever the composition of the thermoplastic, it must first be reduced to the appropriate particle size. The average particle size should be less than about 80

μm, preferably less than 50 μm, and most preferably in the range of 4–50 μm. Particle size is expressed as mean diameters as measured on a Brinkman model 2010 particle size analyzer utilizing volume distribution. Such particle sizes may obtained by traditional means, for example cryogenic grinding, ball or sand milling, etc., but is most advantageously prepared by air jet milling. All such grinding techniques are well known to those skilled in the art. Other means of size reduction, for example spray drying or solution precipitation are also commonly practiced. These latter techniques may be useful, in particular solution precipitation, to produce thermoplastic particles of roughly spherical shape. Such particles have a minimum surface to volume ratio which may be helpful in reducing the viscosity of the overall resin system, particularly those having high thermoplastic loading.

The amount of thermoplastic useful in the subject invention is generally in excess of 5 weight percent. Amounts of thermoplastic up to about 60 weight percent may be useful, but in general, from 10 to about 30 weight percent, preferably from 10 to about 25 weight percent are used. Lower amounts of thermoplastic, i.e. less than 10 percent by weight may prove successful when used in conjunction with another thermoplastic which is also present in the form of soluble or swellable particles or which is dissolved in the other resin system components. The dissolved or particulate thermoplastic may be of a similar type, for example a different, soluble polyimide (e.g. Matrimide ® 5218), or may be a different type of polymer, for example a reactive or non-reactive polysulfone, polyethersulfone, polyetherketone, or the like. The latter are particularly useful when dissolved in the resin system. The molecular weight of these additional, soluble thermoplastics may be from about 2000 to about 150,000 Daltons, but is preferably from 20,000 to about 100,000 Daltons. The additional soluble or particulate thermoplastic may be used in amounts from 1 to about 15 percent, preferably 5 to about 15 percent by weight.

In addition to the primary tougheners such as the toughening modifiers cited earlier, and the secondary tougheners such as the thermoplastic particle tougheners and dissolved thermoplastics, elastomeric particle tougheners may be useful as tertiary tougheners. Such elastomers are well known to those skilled in the art and include, for example, the various ATBN and CTBN elastomers available from the B.F. Goodrich Company, as the HYCAR ® and PROTEUS ® rubbers, and various polysiloxane elastomers, particularly the reactive polysiloxanes such as the aminopropyl terminated polymethyl and polyphenyl polysiloxanes. Such tertiary elastomeric particle tougheners may have particle sizes from 0.01 to 100 μm, preferably from 1.0 to 75 μm, and more preferably from 10 to 20 μm.

Catalysts may also be useful in the resin systems of the subject invention. Such catalysts are well known to those skilled in the art, for example tertiary amines; metal carboxylates, e.g. tin(II) octoate; and particularly the organophosphines, organophosphine salts, complexes, and the reaction products of maleimide group-containing compounds and organophosphines such as those disclosed as useful for epoxy resin systems in U.S. Pat. No. 3,843,605. The resin systems of the subject invention are generally prepared by mixing together the various system components employing standard techniques well known to those skilled in the art, until the resulting mixture is substantially homogeneous.

Following the preparation of the uniform mixture previously described, the thermoplastic particles, particulate elastomers, and catalyst(s) are added at as low a temperature as possible. A substantial amount, i.e. more than 30 percent, preferably more than 70 percent of particulate thermoplastic should remain in particulate form in the resin system.

The resin systems, prepared as described, may be cast as a thin film for use as an adhesive or, preferably, for use as a prepregging matrix resin. When used as a prepregging resin, the resulting prepreg should be as uniform as possible to achieve optimal properties when cured into composite parts. Prepregging techniques are well known to those skilled in the art, as disclosed, for example, in U.S. Pat. No. 3,784,433 which is herein incorporated by reference. The resin content of the prepreg may be adjusted by varying the thickness, and hence the areal weight of the resin films. The resin content is generally between 20 and 60 percent by weight, more preferably between 20 and 40 percent by weight.

By whichever method the prepreg is prepared, the net result is a prepreg having a thermoplastic rich or thermoplastic particle rich layer which is contiguous with but substantially exterior to the fiber reinforcement and its surrounding resin. During cure, the thermoplastic particles are believed to swell and/or dissolve, producing a cured resin having a thermoplastic concentration gradient which is greatest at or near what was the surface of the prepreg.

When such prepregs are layed up into composite structures and cured, the thermoplastic enriched area lies in the interply zone substantially medially between the fiber reinforcement layers. The composites prepared by this method may contain thermoplastic in the form of a continuous or quasi-continuous layer between the plies, this layer containing both thermoplastic and thermosetting resin components.

In the examples which follow, C-353A is Compimide ® 353A, a eutectic mixture of bismaleimides available from the Shell Chemical Company; DABA is diallylbisphenol A; P84 is Lenzing P84 polyimide: NC-514 is Cardolite ® NC-514, an epoxy resin with a viscosity of 25,000 cps and an epoxy equivalent weight of 350; NC-551 is Cardolite ® NC-551, an epoxy resin with a viscosity of 600 cps and an epoxy equivalent weight of 225; Heloxy is Heloxy ® 69 which is a resorcinol diglycidyl ether available from the Wilmington Chemical Company; XB-3336 is bisphenol F diglycidyl ether having an epoxy equivalent weight of 174 and a viscosity of approximately 6000 cps. MY-0510 is trisglycidyl p-aminophenol having an epoxy equivalent weight of 95 to 107 and a viscosity of 550 to 850 cps. BMI-1 is the bismaleimide of 4,4'-methylenedianiline; BMI-2 is the bismaleimide of toluenediamine; DMAB is dimethoxyallylbenzene and TAIC is triallyl-1,3-triazine-2,4,6(1H,3H,5H)-trione, both low viscosity nonepoxy modifiers for comparison purposes. TPP is triphenylphosphine.

Resin mixing procedures are well known to those skilled in the art. The components are generally mixed at the lowest temperatures possible so as not to lead to advancement of the resin. The prepared resin systems were coated onto release paper and used to impregnate unidirectional intermediate modulus carbon fibers at a resin content of 33±3 percent and an areal fiber weight of 145±5 g/m$^2$. The resulting prepregs were layed up in a quasiisotropic layup and autoclave cured at 420° F.

for 3-4 hours. The panels were tested for compression strength after impact by Boeing test method BSS-7260 after being impacted at 1500 in-lb/in. Compositions and test results are presented in Tables I and II.

The ability of the epoxy to toughen is not confined to a particular level of thermoplastic. Example F contained 10 weight percent thermoplastic while Examples E and G contained 20 weight percent. All showed large

TABLE I[2]

| COMPOSITION | Example[1] | | | | | | | |
|---|---|---|---|---|---|---|---|---|
| | 1 | 2 | 3 | 4 | A | B | C | D |
| BISMALEIMIDES | | | | | | | | |
| BMI-1 | 16.2 | 32.2 | 25.7 | 22.8 | 27.0 | 27.0 | 30 | 28.5 |
| BMI-2 | 32.2 | 16.2 | 25.6 | 22.8 | 26.9 | 26.9 | 30 | 28.5 |
| C-353 | | | | | | | | |
| DABA | 32.3 | 32.3 | 34.2 | 30.4 | 29.7 | 29.7 | 40 | 38 |
| EPOXY - amount | 4.25 | 4.25 | 4.5 | 4.0 | | | | 5.0 |
| (type) | (Heloxy) | (Heloxy) | (Heloxy) | (MY-0510) | | | | (Heloxy) |
| Other | | | | | 4.5 (DMAB) | 4.5 (TAIC) | 0.15[3] (TPP) | 0.15[3] (TPP) |
| P-84 | 15 | 15 | 10 | 20 | 10 | 10 | — | — |
| CAI (Boeing BSS-7260),[4] Ksi | 50 | 48 | 48 | 39 | 35 | 32 | 29 | 29 |

[1]Lettered examples are comparative examples.
[2]Composition values in parts per hundred parts of total resin system.
[3]Catalyst added for flow control.
[4]Impact level of 1500 in-lb/in.

TABLE II[2]

| COMPOSITION | Example[1] | | | | | | | | |
|---|---|---|---|---|---|---|---|---|---|
| | E | F | G | 5 | 6 | 7 | 8 | 9 | 10 |
| BISMALEIMIDES | | | | | | | | | |
| BMI-1 | — | 27.0 | 24 | 22.8 | 21.6 | 22.8 | 22.8 | 22.8 | — |
| BMI-2 | — | 27.0 | 24 | 22.8 | 21.6 | 22.8 | 22.8 | 22.8 | — |
| C-353 | 48 | | | | | | | | 45.6 |
| DABA | 32 | 36 | 32.4 | 30.4 | 28.8 | 30.4 | 30.4 | 30.4 | 30.4 |
| EPOXY - amount | — | — | — | 4 | 8 | 4 | 4 | 4 | 4 |
| (type) | | | | (Heloxy) | (Heloxy) | (XB-3336) | (NC551) | (NC514) | (Heloxy) |
| P-84 | 20 | 10 | 20 | 20 | 20 | 20 | 20 | 20 | 20 |
| CAI (Boeing BSS-7260)[3] Ksi | 37 | 34 | 41 | 49 | 48 | 47 | 45 | 44 | 45 |

[1]Lettered examples are comparative examples.
[2]Composition values in parts per hundred parts of total resin system.
[3]Impact level of 1500 in-lb/in.

Other low viscosity modifiers which are coreactants with bismaleimides were found not to be effective in increasing CAI. Thus Examples A and B both gave lower CAI than the control with no low viscosity modifier (Example G). While these non-epoxy low viscosity modifiers are not effective in and of themselves in increasing toughness, it is expected that they may be used in conjunction with a low viscosity epoxy and thermoplastic if desired, for example, to further increase the tack or drape of a resin system.

The examples in the tables also show that the additive of a suitable low viscosity epoxy resin to bismaleimide formulations containing suitable thermoplastic particles causes a sharp increase in the compression strength after impact. In particular, bismaleimide resin systems capable of preparing quasiisotropic composites exhibiting values of greater than 45 Ksi on intermediate modulus carbon fiber when tested according to BSS-7260 were previously unknown.

The CAI of Example F, for instance, with thermoplastic but no epoxy, increased from 34 ksi to 48 ksi (Example 3) when the only change was the addition of a small amount (4.5 weight percent) of a suitable low viscosity epoxy resin, a 41 percent increase in impact resistance. Similarly, the CAI of Example E which contains thermoplastic but no epoxy increased from 37 ksi to 45 ksi, a 22 percent increase, when the epoxy is added to the formulation (Example 10). These increases are statistically significant, being far beyond the range of scatter, and result in performance levels previously unheard of in bismaleimide resin systems.

increases in CAI with epoxy addition (Examples 3, 10 and 5 respectively).

The epoxy itself is not a toughener. The combination of epoxy and thermoplastic is an essential requirement. That this is so is illustrated by Examples C and D which contain no thermoplastic. Example D, which contains the epoxy, has approximately the same CAI as Example C containing no epoxy. Thus the epoxy acts as a toughener only in conjunction with the thermoplastic.

The particular bismaleimide monomer content does not greatly influence the toughness when both thermoplastic and epoxy are present. Examples 1, 2, 10, and 5 demonstrate a variety of bismaleimide monomer ratios, and all have excellent CAI values in the range of 45 to 50 ksi.

The type of epoxy which is effective covers a wide range. Examples 5, 7, 8, and 9, containing different epoxies, all showed significant increass in CAI over the control formulation containing no epoxy, Example G. Likewise, the effective amount of epoxy spans a wide range. For instance, 8 weight percent (Example 6) was as effective as 4 weight percent (Example 5).

The embodiments of the invention in which an exclusive privilege or property is claimed are defined as follows:

1. A thermosetting bismaleimide resin system, comprising:
   a) 30 weight percent or greater of one or more thermosetting bismaleimide monomers;

b) from 1 to about 30 weight percent of a low viscosity epoxy resin toughener effective to toughen said bismaleimide resin system;

c) from 5 to about 30 weight percent, based on the total resin system, of one or more particulate thermoplastics which are soluble or swellable in said bismaleimide resin system upon cure of said system, and which are effective in toughening said bismaleimide resin system as reflected by an increase in the compression strength after impact when tested according to Boeing Support Specification BSS 7260; and d) from 5 to about 50 weight percent of a comonomer selected from the group consisting of alkenyl and alkynyl group containing compounds, wherein a substantial amount of said thermoplastic remains in the uncured resin system in particulate form having a mean particle size of from 2 $\mu$m to about 80 $\mu$m.

2. The resin system of claim 1 wherein said comonomer is selected from the group consisting of alkenylphenyl, alkynylphenyl, alkenylphenol, alkynylphenol, alkenylphenoxy, and alkynylphenoxy-terminated compounds.

3. The resin system of claim 2 wherein said comonomer is selected from the group consisting of the diallylbisphenols and the dipropenylbisphenols.

4. The resin system of claim 3 wherein said comonomer is selected from the group consisting of diallylbisphenol A and dipropenylbisphenol A.

5. The resin system of claim 4 wherein said bismaleimide (a) is the bismaleimide, nadicimide or allylnadicimide of a diamine selected from the group consisting of 1,6-hexanediamine, 2,2,4-trimethyl-1,6-hexanediamine, toluenediamine, methylenedianiline, isophoronediamine, and mixtures thereof.

6. The thermosetting bismaleimide resin system of claim 1, wherein said epoxy resin contains two epoxy groups.

7. The resin system of claim 6 wherein said comonomer is selected from the group consisting of alkenylphenyl, alkynylphenyl, alkenylphenol, alkynylphenol, alkenylphenoxy, and alkynylphenoxy-terminated compounds.

8. The resin system of claim 7 wherein said comonomer is selected from the group consisting of the diallylbisphenols and the dipropenylbisphenols.

9. The resin system of claim 8 wherein said comonomer is selected from the group consisting of diallylbisphenol A and dipropenylbisphenol A.

10. The resin system of claim 9 wherein said bismaleimide (a) is the bismaleimide, nadicimide, or allylnadicimide of a diamine selected from the group consisting of 1,6-hexanediamine, 2,2,4-trimethyl-1,6-hexanediamine, toluenediamine, methylenedianiline, isophoronediamine, and mixtures thereof.

11. A thermosetting bismaleimide resin system, comprising:

a) 30 weight percent or greater of one or more thermosetting bismaleimide monomers;

b) from 1 to about 30 weight percent of a low viscosity epoxy resin toughener effective to toughen said bismaleimide resin system;

c) from 5 to about 30 weight percent of one or more particulate thermoplastics which are soluble or swellable in said bismaleimide resin system upon cure of said system, wherein a major portion of said thermoplastic comprises a thermoplastic polyimide whose repeating units correspond to those derived from i) a dianhydride comprising:

Y—X—Y wherein Y is a phthalyl anhydride group and X is a linking group selected from the group consisting of a covalent bond,

—CR$_2$—, —CO—, —O—, —O—CO—O—,

—NH—CO—, —S—, —SO—, and —SO$_2$—, wherein R is phenyl, C$_6$–C$_{10}$ cycloalkyl, C$_1$–C$_4$ alkyl, -C(CF$_3$)$_2$-, pyromellitic dianhydride, or mixtures thereof; and ii) a diamine, wherein at least 50 weight percent of residues of said diamine comprise residues of toluene diamine and methylenedianiline; and d) from 5 to about 50 weight percent of a comonomer selected from the group consisting of alkenyl and alkynyl group containing compounds, wherein a substantial amount of said thermoplastic remains in the uncured resin system in particulate form having a mean particle size of from 2 $\mu$m to about 80 $\mu$m.

12. The thermosetting bismaleimide resin system of claim 11, wherein said epoxy resin is selected from the group consisting of bisphenol A diglycidyl ether, bisphenol F diglycidyl ether, resorcinol diglycidyl ether, and mixtures thereof.

13. The resin system of claim 12 wherein said comonomer is selected from the group consisting of alkenylphenyl, alkynylphenyl, alkenylphenol, alkynylphenol, alkenylphenoxy, and alkynylphenoxy-terminated compounds.

14. The resin system of claim 13 wherein said comonomer is selected from the group consisting of the diallylbisphenols and the dipropenylbisphenols.

15. The resin system of claim 14 wherein said comonomer is selected from the group consisting of diallylbisphenol A and dipropenylbisphenol A.

16. The resin system of claim 15 wherein said bismaleimide (a) is the bismaleimide, nadicimide, or allylnadicimide of a diamine selected from the group consisting of 1,6-hexanediamine, 2,2,4-trimethyl-1,6-hexanediamine, toluenediamine, methylenedianiline, isophoronediamine, and mixtures thereof.

17. The resin system of claim 11 wherein said comonomer is selected from the group consisting of alkenylphenyl, alkynylphenyl, alkenylphenol, alkynylphenol, alkenylphenoxy, and alkynylphenoxy-terminated compounds.

18. The resin system of claim 17 wherein said comonomer is selected from the group consisting of the diallylbisphenols and the dipropenylbisphenols.

19. The resin system of claim 18 wherein said comonomer is selected from the group consisting of diallylbisphenol A and dipropenylbisphenol A.

20. The resin system of claim 19 wherein said bismaleimide (a) is the bismaleimide, nadicimide, or allylnadicimide of a diamine selected from the group consisting of 1,6-hexanediamine, 2,2,4-trimethyl-1,6-hexanediamine, toluenediamine, methylenedianiline, isophoronediamine, and mixtures thereof.

21. A thermosetting bismaleimide resin system comprising:

a) 30 weight percent or greater of one or more thermosetting bismaleimide monomers;

b) from 1 to about 10 weight percent of one or more difunctional low viscosity epoxy resin tougheners which are the glycidyl ethers of a phenol selected from the group consisting of bisphenol A, bisphenol F, and resorcinol, said 1 to about 10 weight percent being effective to toughen said bismaleimide resin system;

c) from 5 to about 30 weight percent of one or more particulate thermoplastics which are soluble or swellable in said bismaleimide resin system upon cure of said system, and wherein up to about one third of said thermoplastic comprises an engineering thermoplastic having a $T_g$ greater than about 150° C. and the remainder comprises a thermoplastic polyimide the majority of whose repeating units correspond to those derived from benzophenone tetracarboxylic dianhydride, methylenedianiline, and toluenediamine; and d) from 5 to about 50 weight percent of a comonomer selected from the group consisting of alkenyl and alkynyl group-containing compounds wherein a substantial amount of said thermoplastic remains in the uncured resin system in particulate form having a mean particle size of from 2 μm to about 80 μm.

22. The resin system of claim 21 wherein said comonomer is selected from the group consisting of alkenylphenyl, alkynylphenyl, alkenylphenol, alkynylphenol, alkenylphenoxy, and alkynylphenoxy-terminated compounds.

23. The resin system of claim 22 wherein said comonomer is selected from the group consisting of the diallylbisphenols and the dipropenylbisphenols.

24. The resin system of claim 23 wherein said comonomer is selected from the group consisting of diallylbisphenol A and dipropenylbisphenol A.

25. The resin system of claim 24 wherein said bismaleimide (a) is the bismaleimide, nadicimide, or allylnadicimide of a diamine selected from the group consisting of 1,6-hexanediamine, 2,2,4-trimethyl-1,6-hexanediamine, toluenediamine, methylenedianiline, isophoronediamine, and mixtures thereof.

* * * * *